United States Patent
Kamakura

(10) Patent No.: US 10,037,415 B2
(45) Date of Patent: Jul. 31, 2018

(54) INFORMATION PROCESSING SYSTEM THAT AUTHENTICATES LICENSE OF APPLICATION PROGRAM INSTALLED IN INFORMATION PROCESSING APPARATUS, AND INFORMATION PROCESSING METHOD

(71) Applicant: KYOCERA DOCUMENT SOLUTIONS INC., Osaka (JP)

(72) Inventor: Aya Kamakura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/818,883

(22) Filed: Nov. 21, 2017

(65) Prior Publication Data

US 2018/0144109 A1    May 24, 2018

(30) Foreign Application Priority Data

Nov. 24, 2016 (JP) .................................. 2016-227784

(51) Int. Cl.
*G06F 21/10* (2013.01)
*G06F 21/62* (2013.01)

(52) U.S. Cl.
CPC .......... *G06F 21/105* (2013.01); *G06F 21/629* (2013.01); *G06F 2221/0768* (2013.01)

(58) Field of Classification Search
CPC ................. G06F 21/105; G06F 21/629; G06F 2221/0768
See application file for complete search history.

(56) References Cited

U.S. PATENT DOCUMENTS

| 8,245,286 B2 * | 8/2012 | Nasu ............... H04L 63/0823 713/156 |
| 2005/0114267 A1 * | 5/2005 | Miwa ................. G06F 21/10 705/59 |
| 2006/0112019 A1 * | 5/2006 | Roberts, Jr. ............. G06F 21/10 705/59 |

(Continued)

FOREIGN PATENT DOCUMENTS

| JP | 2008-033561 A | 2/2008 |
| JP | 2008-177683 A | 7/2008 |

*Primary Examiner* — Beemnet Dada
(74) *Attorney, Agent, or Firm* — Li & Cai Intellectual Property (USA) Office

(57) ABSTRACT

An information processing system includes: one or more information processing apparatuses; and a management server, in which the management server includes a license key table management unit that receives inputs of a serial number, an application ID, and a license key from an administrator and registers them in a license key table, and a license key authentication unit that extracts the corresponding license key from the license key table by using the application ID and the serial number received from the information processing apparatus in which the application program is installed, and performs license key authentication of the application program by using the extracted license key, and the one or more information processing apparatuses each include an application installation unit that installs the application program, and an authentication requesting unit that transmits the application ID and the serial number to the management server to request for license key authentication.

7 Claims, 6 Drawing Sheets

(56) References Cited

U.S. PATENT DOCUMENTS

2007/0198851 A1\* 8/2007 Goto .................. G06F 12/145
  713/187
2008/0027742 A1 1/2008 Maeda
2008/0170696 A1 7/2008 Yoshimura et al.
2017/0170972 A1\* 6/2017 Wu .................. H04L 9/3263

\* cited by examiner

17a: License key table

| Serial number | Application ID | License key |
|---|---|---|
|  |  |  |
|  |  |  |
|  |  |  |
|  |  |  |
|  |  |  |
|  |  |  |

INFORMATION PROCESSING SYSTEM THAT AUTHENTICATES LICENSE OF APPLICATION PROGRAM INSTALLED IN INFORMATION PROCESSING APPARATUS, AND INFORMATION PROCESSING METHOD

CROSS REFERENCE TO RELATED APPLICATION

This application claims the benefit of Japanese Priority Patent Application JP 2016-227784 filed Nov. 24, 2016, the entire contents of which are incorporated herein by reference.

BACKGROUND OF THE INVENTION

1. Field of the Invention

The present disclosure relates to an information processing system and an information processing method that authenticate a license of an application program installed in an information processing apparatus such as an image forming apparatus (MFP, Multifunction Peripheral).

2. Description of Related Art

In the past, when an application program is installed in an information processing apparatus, it has been practiced to input a license key to activate the application program.

It is desirable to provide an information processing system and an information processing method of performing license key authentication of an application program without an end user handling a license key.

SUMMARY OF THE INVENTION

An information processing system according to an embodiment of the present disclosure includes: one or more information processing apparatuses; and a management server that is connected to the one or more information processing apparatuses via a network and manages a license key for activating an application program installed in any of the one or more information processing apparatuses, in which the management server includes a first communication device configured to communicate with the one or more information processing apparatuses, a first storage device configured to store a license key table, a serial number for uniquely identifying the information processing apparatus that installs the application program, an application ID for uniquely identifying the application program to be installed, and the license key for activating the application program to be installed being registered in the license key table in association with each other, a first ROM that stores a first information processing program, and a first processor that executes the first information processing program, when the first processor executes the first information processing program, the first processor operates as a license key table management unit that receives inputs of the serial number, the application ID, and the license key from an administrator and registers the received serial number, the received application ID, and the received license key in the license key table in association with each other, and a license key authentication unit that extracts the corresponding license key from the license key table by using the application ID and the serial number received from the information processing apparatus in which the application program is installed, and performs license key authentication of the application program installed in the information processing apparatus in which the application program is installed by using the extracted license key, the one or more information processing apparatuses each include a second communication device configured to communicate with the management server, a second storage device that stores the serial number corresponding to the information processing apparatus itself, a second ROM that stores a second information processing program, and a second processor that executes the second information processing program, and when the second processor executes the second information processing program, the second processor operates as an application installation unit that installs the application program in the information processing apparatus itself based on instructions input by an end user, and an authentication requesting unit that transmits the application ID of the application program installed in the information processing apparatus itself and the serial number stored in the second storage device to the management server to request for license key authentication.

An information processing method according to an embodiment of the present disclosure is an information processing method for an information processing system including one or more information processing apparatuses and a management server connected to each other via a network, the management server managing a license key for activating an application program installed in any of the one or more information processing apparatuses, the information processing method including: receiving, by a license key table management unit of the management server, from an administrator, inputs of a serial number for uniquely identifying the information processing apparatus that installs the application program, an application ID for uniquely identifying the application program to be installed, and the license key; registering, by a license key table management unit of the management server, the received serial number, the received application ID, and the received license key in a license key table in association with each other; installing, by an application installation unit of the information processing apparatus in which the application program is to be installed, the application program in the information processing apparatus itself based on instructions input by an end user; transmitting, by an authentication requesting unit of the information processing apparatus that has installed the application program, the application ID of the application program installed in the information processing apparatus itself and the serial number stored in a storage device of the information processing apparatus itself to the management server to request for license key authentication; extracting, by a license key authentication unit of the management server, the corresponding license key from the license key table by using the application ID and the serial number received from the information processing apparatus that has installed the application program; and performing, by a license key authentication unit of the management server, license key authentication of the application program installed in the information processing apparatus that has installed the application program by using the extracted license key.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 shows an example of a license key table 17a;

FIG. 4 shows an application package 17b;

DETAILED DESCRIPTION OF THE PREFERRED EMBODIMENTS

Hereinafter, an embodiment of the present disclosure will be described with reference to the drawings. Note that in the description below, an image forming apparatus is exemplified as an information processing apparatus in which an application program is installed and executed.

Entire Configuration

Figure 1:
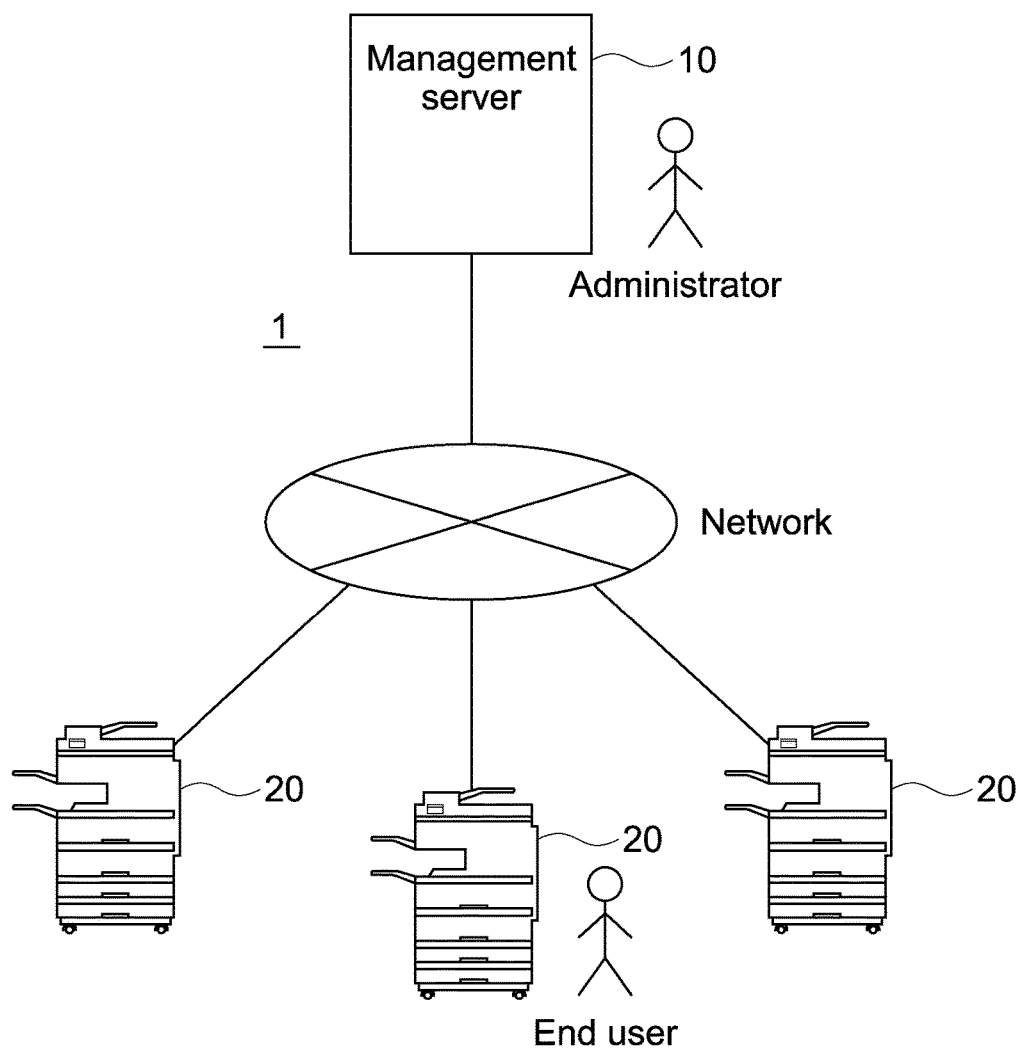
FIG. 1 shows a configuration of an information processing system 1 according to an embodiment of the present disclosure.

First, a configuration of an information processing system 1 according to an embodiment of the present disclosure will be described. FIG. 1 shows a configuration of the information processing system 1 according to an embodiment of the present disclosure.

The information processing system 1 includes a management server 10 and one or more image forming apparatuses 20 connected to a network.

In the management server 10, an administrator registers a license key for activating an application program installed in the image forming apparatus 20.

After the end user installs an application program in each image forming apparatus 20, the image forming apparatus 20 communicates with the management server 10 and performs authentication with a license key.

Since the authentication with a license key is performed by a license key registered in the management server 10, the end user does not need to input a license key when authenticating the application program installed in the image forming apparatus 20 at hand.

The configuration of the information processing system 1 according to an embodiment of the present disclosure has been described heretofore.

Configuration of Management Server

Figure 2:
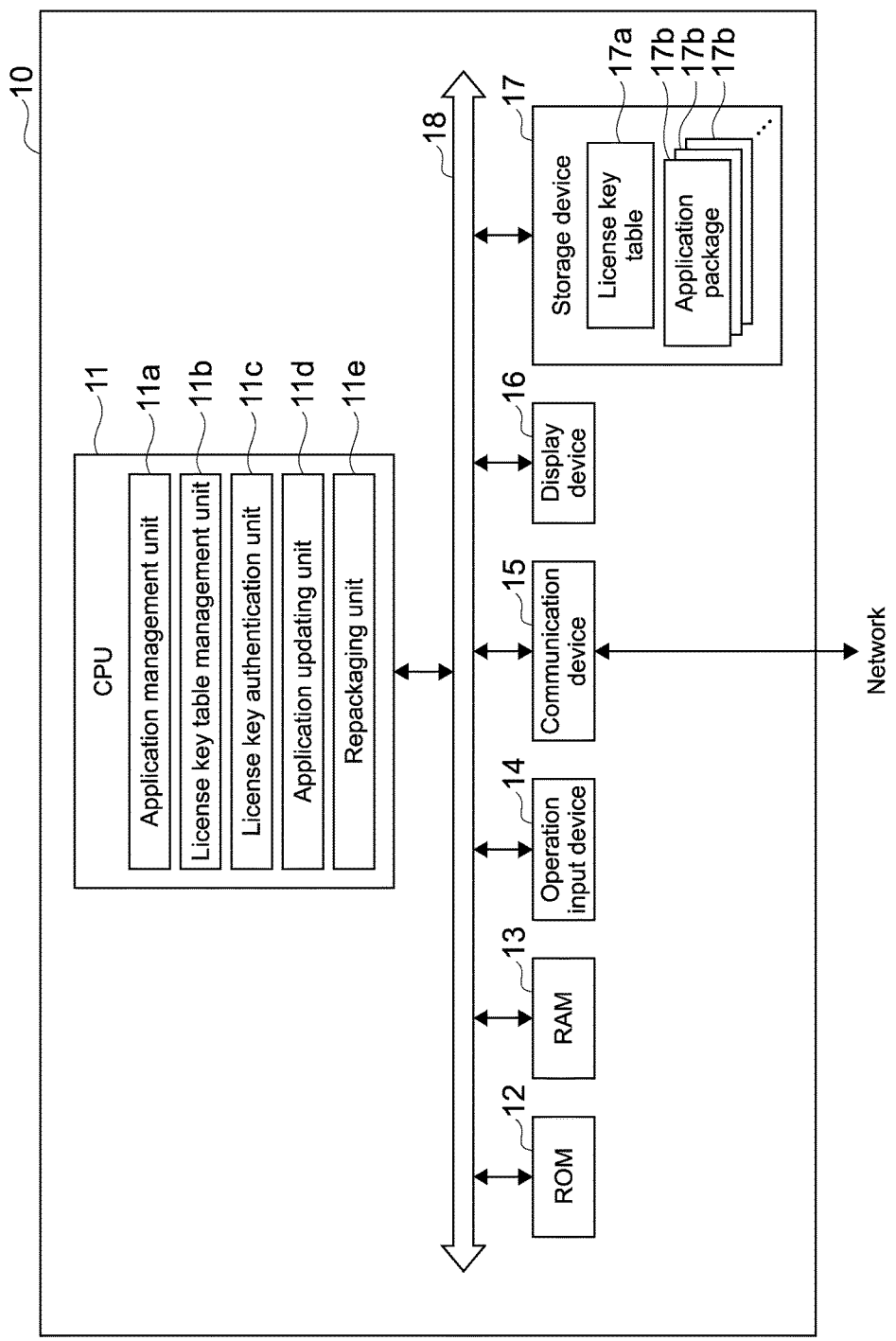
FIG. 2 shows a block configuration of a management server 10.

Next, a configuration of the management server 10 will be described. The management server 10 may include dedicated hardware or software or a general-purpose computer. FIG. 2 shows a block configuration of the management server 10.

As shown in FIG. 2, the management server 10 includes a CPU (Central Processing Unit) 11, a ROM (Read Only Memory) 12, a RAM (Random Access Memory) 13, an operation input device 14, a communication device 15 (first communication device), a display device 16, a storage device 17 (first storage device), and these blocks are connected to each other via a bus 18.

The ROM 12 stores a plurality of programs such as firmware for executing various types of process, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, various types of data, a license key table 17a, and one or more application packages 17b. The license key table 17a and the application package 17b will be described later.

The communication device 15 is connected to a network for sending/receiving information to/from the image forming apparatus 20.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 of the management server 10 executes a program, the CPU 11 operates as the functional blocks described below.

The functional blocks that the CPU 11 of the management server 10 realizes include an application management unit 11a, a license key table management unit 11b, a license key authentication unit 11c, an application updating unit 11d, and a repackaging unit 11e.

The application management unit 11a manages the application package 17b stored in the storage device 17.

More specifically, the application management unit 11a downloads the application package 17b stored in the storage device 17 to the image forming apparatus 20, and becomes an upload destination when the application package 17b installed in the image forming apparatus 20 is uploaded to the management server 10.

The license key table management unit 11b manages the license key table 17a stored in the storage device 17.

More specifically, the license key table management unit 11b receives, from an administrator, inputs of a serial number of the image forming apparatus 20 that installs an application program via the operation input device 14, an application ID of the application program to be installed, and a license key for activating the application program to be installed, and registers the information in the license key table 17a. Note that the license key table 17a will be described later.

The license key authentication unit 11c authenticates the application program installed in the image forming apparatus 20 by using the license key registered in the license key table 17a.

More specifically, the license key authentication unit 11c extracts a corresponding license key from the license key table 17a by using the application ID and the serial number received from the image forming apparatus 20 in which the application program is installed, and authenticates the application program installed in the image forming apparatus 20 by using the extracted license key.

In the case where the license key authentication unit 11c succeeds in authenticating the application program, the application updating unit 11d determines whether or not the same version as that of the application program installed in the image forming apparatus 20 is stored in the management server 10. In the case where there is no same version, upload of the application program is performed from the image forming apparatus 20.

In the case where the license key authentication unit 11c succeeds in authenticating the application program, the repackaging unit 11e rewrites license authentication necessity information included in an application code file (to be described later) received from the image forming apparatus 20 in which the application program is installed from "license authentication necessary" to "license authentication unnecessary" before repackaging the application package 17b to remake it.

The repackaging unit 11e causes the image forming apparatus 20 in which the application program is installed to download the application package 17b whose the license authentication necessity information is rewritten to "license authentication unnecessary", and to perform overwrite installation of the downloaded application package 17b. Accordingly, in the image forming apparatus 20 in which the repackaged application package 17b is installed, it is possible to use the authenticated application program without being requested for license authentication in the future.

The configuration of the management server 10 has been described heretofore.

Regarding License Key Table

Figures 3, 4:
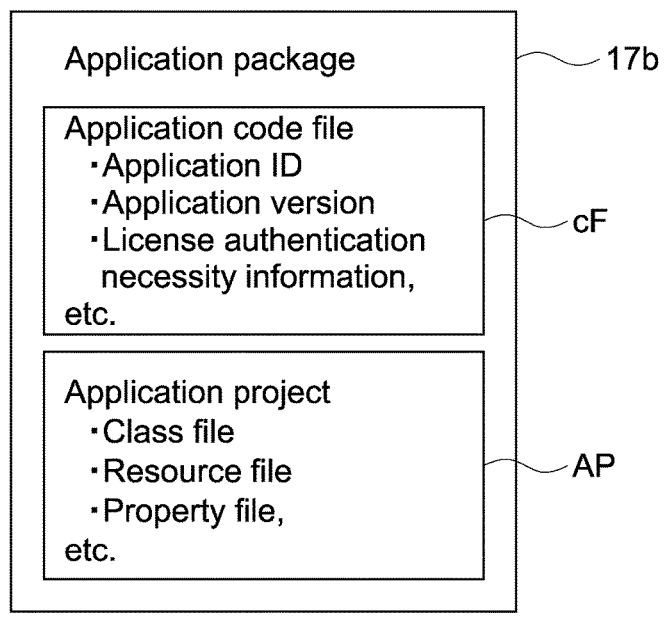

Next, the license key table 17a will be described. FIG. 3 shows an example of the license key table 17a.

As shown in FIG. 3, the license key table 17a is a table in which a serial number for uniquely identifying the image forming apparatus 20, an application ID for uniquely identifying the application program, and a license key for activating a specific application program in the specific image forming apparatus 20 are registered in association with each other.

The license key table 17a is managed by the license key table management unit 11b.

The serial number, the application ID, and the license key registered in the license key table 17a may be acquired by an administrator of the management server 10 at the time when the installation plan of a specific application program to the image forming apparatus 20 is found out, and may be registered in the license key table 17a, for example.

When the application program is installed in the specific image forming apparatus 20, the serial number of the image forming apparatus 20 and the application ID of the installed application program are transmitted to the management server 10 for authentication.

The license key authentication unit 11c of the management server 10 searches the license key table 17a by using the serial number and the application ID as a key to extract a corresponding license key.

The license key table 17a has been described heretofore.

Regarding Application Package

Next, the application package 17b will be described. FIG. 4 shows a configuration of the application package 17b.

As shown in FIG. 4, one application package 17b includes an application code file CF that collectively includes attribution information of the application program and an application project AP that is a program main body.

The application code file CF includes the application ID, the application version that represents the version of the application, the license authentication necessity information that represents whether or not license authentication is required, and the like The application project AP includes a class file, a resource file, a property file, and the like for executing the application program on Java (registered trademark) virtual machine by the image forming apparatus 20.

The application package 17b has been described heretofore.

Regarding Application ID and Version

Figure 5:
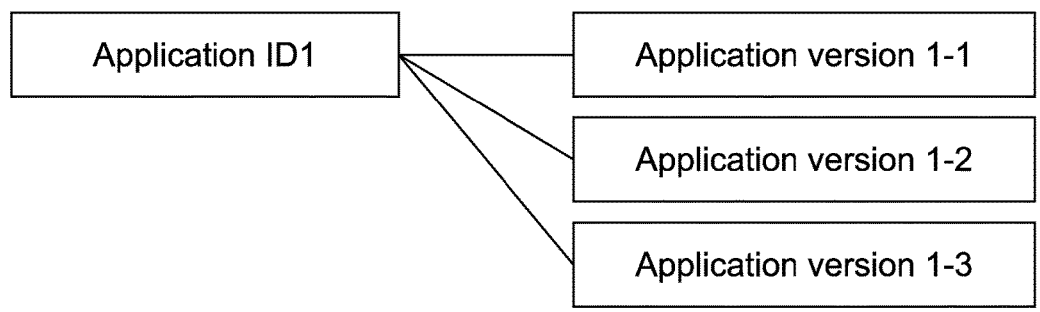
FIG. 5 shows a relationship between an application ID and a version of an application program.

Next, the application ID and version of the application program will be described. FIG. 5 shows a relationship between the application ID and the version of the application program.

As shown in FIG. 5, a plurality of versions of the application program are associated with one application ID.

Therefore, in order to uniquely identify the application program also with the version, it is necessary to specify the application ID and the application version.

The application ID and the version of the application program has been described heretofore.

Configuration of Image Forming Apparatus

Figure 6:
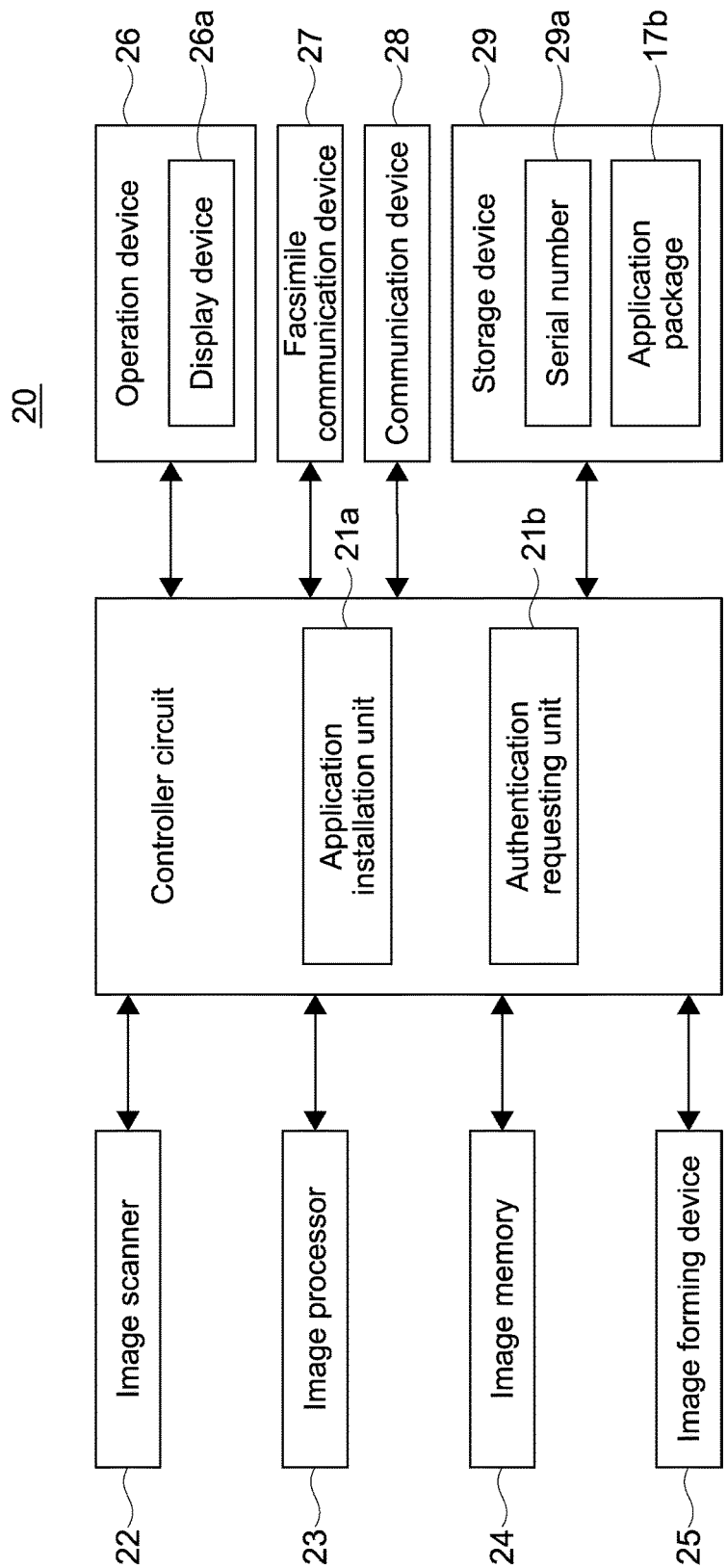
FIG. 6 shows a configuration of an image forming apparatus 20.

Next, a configuration of the image forming apparatus 20 will be described. FIG. 6 shows the configuration of the image forming apparatus 20.

The image forming apparatus 20 includes a controller circuit 21. The controller circuit 21 includes a CPU, a RAM, a ROM, dedicated hardware circuits, and the like and performs overall operational control of the image forming apparatus 20.

The controller circuit 21 is connected to an image scanner 22, an image processor 23, an image memory 24, an image forming device 25, an operation device 26, a display device 26a, a facsimile communication device 27, a communication device 28 (second communication device), a storage device 29 (second storage device), and the like. The controller circuit 21 performs operational control of the respective devices connected thereto and sends/receives signals and data to/from those devices.

According to job execution instructions input by a user via the operation device 26 or a personal computer (PC) connected to the network, the controller circuit 21 controls drive and process of mechanisms requisite for executing operational control of functions such as a scanner function, a printing function, a copy function, and a facsimile sending/receiving function.

Further, the controller circuit 21 includes an application installation unit 21a and an authentication requesting unit 21b. The CPU of the image forming apparatus 20 loads a program, which is stored in a ROM or the like, in a RAM and executes the program. When the CPU of the image forming apparatus 20 executes the program, the CPU operates as the application installation unit 21a and the authentication requesting unit 21b, which are functional blocks.

According to instructions input by an end user, the application installation unit 21a installs the application package 17b in the image forming apparatus 20 itself. Further, in the case where license key authentication for the installed application succeeds in the management server 10, the overwrite installation of the application package 17b repackaged in in the management server 10 is performed.

In the case where the application package 17b installed by the application installation unit 21a requires license key authentication, the authentication requesting unit 21b transmits a serial number 29a of the image forming apparatus 20 itself stored in the storage device 29 and the application ID included in the installed application package 17b to the management server 10 to request for license key authentication.

The image scanner 22 reads an image from a script.

The image processor 23 carries out an image process as necessary on image data of an image read by the image scanner 22. For example, the image processor 23 corrects shading of an image read by the image scanner 22 and carries out other image process to improve the quality of the image to be formed.

The image memory 24 includes an area that temporarily stores data of a script image read by the image scanner 22 or data to be printed by the image forming device 25.

The image forming device 25 forms an image of image data and the like read by the image scanner 22.

The operation device 26 includes a touch panel device and an operation key device that accept user's instructions on various operations and processes executable by the image forming apparatus 20. The touch panel device includes the display device 26a such as an LCD (Liquid Crystal Display) equipped with a touch panel.

The facsimile communication device 27 includes an encoding/decoding device, a modulation/demodulation device, and an NCU (Network Control Unit) (all of which are not shown) and transmits facsimiles using a public telephone network.

The communication device 28 is constituted of a communication module such as a LAN board and sends/receives various types of data to/from apparatuses such as the management server 10 via a LAN connected to the communication device 28, and the like.

The storage device 29 stores a script image read by the image scanner 22, the serial number 29a, the application package 17b, and the like. The storage device 29 is a large-volume storage device such as an HDD. Note that the serial number 29a is a number uniquely identifying the image forming apparatus 20, such as the serial number of the image forming apparatus 20.

The configuration of the image forming apparatus 20 has been described heretofore.

Flowchart of a Process

Figure 7:
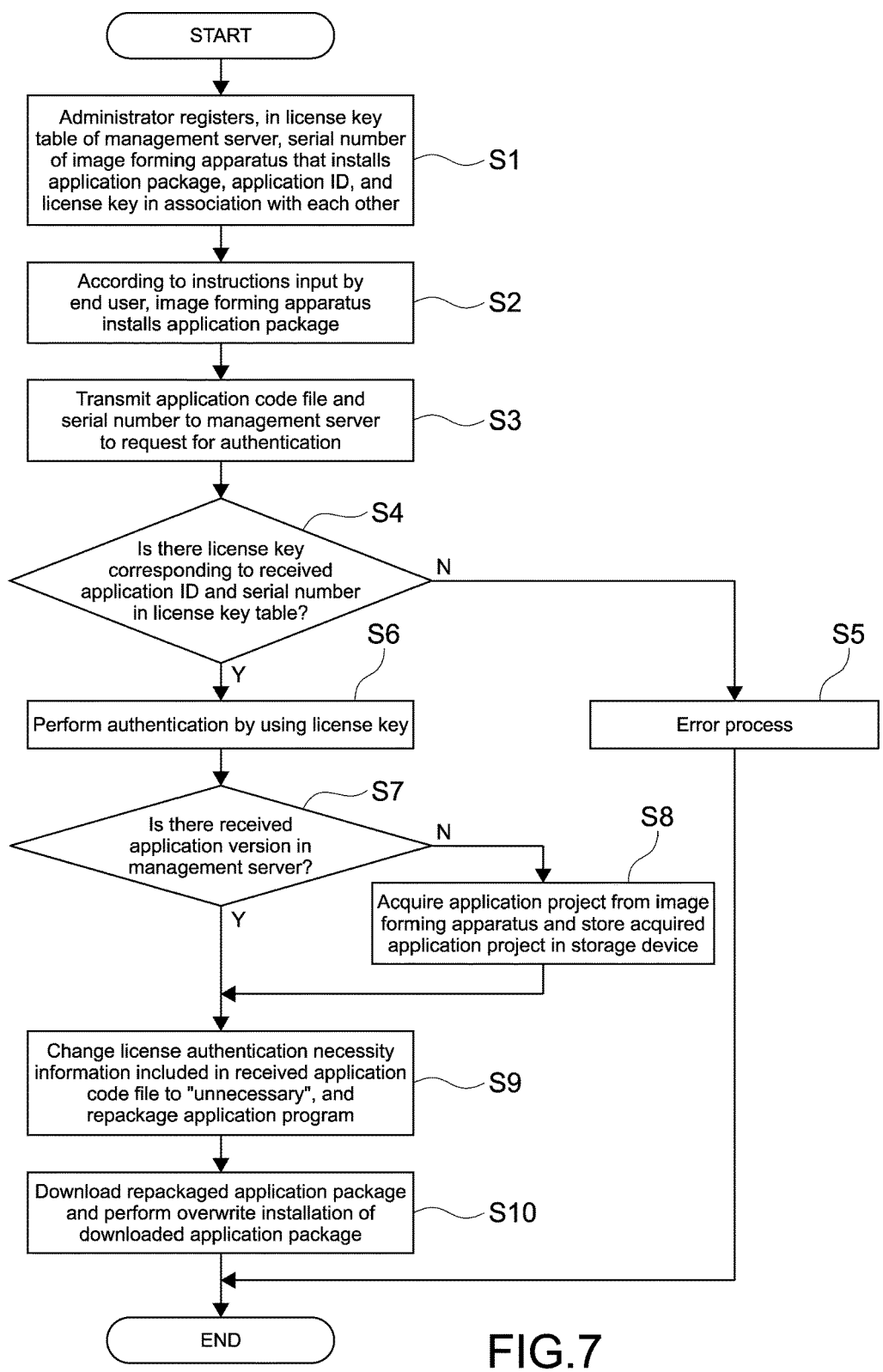
FIG. 7 shows flowchart of a process in the information processing system 1.

Next, flowchart of a process in the information processing system 1 will be described. FIG. 7 shows flowchart of the process in the information processing system 1.

First, an administrator registers, in the license key table 17a of the management server 10, the serial number 29a of the image forming apparatus 20 that installs the application package 17b, an application ID of an application program to be installed, and a license key in association with each other (Step S1).

Next, according to instructions input by an end user, the application installation unit 21a of the image forming apparatus 20 installs the application package 17b in the image forming apparatus 20 (Step S2).

Next, the authentication requesting unit 21b of the image forming apparatus 20 transmits the application code file CF (including an application ID and an application version) of the installed application package 17b and the serial number 29a to the management server 10 to request for license key authentication (Step S3).

Next, the license key authentication unit 11c of the management server 10 determines whether or not there is a license key corresponding to the received application ID and the serial number 29a in the license key table 17a (Step S4).

In the case where the license key is not in the license key table 17a (N in Step S4), the management server 10 performs an error process (Step S5), and finishes the process.

In the case where there is the license key (Y in Step S4), the license key authentication unit 11c performs authentication by using the license key (Step S6).

Next, the application updating unit 11d determines whether or not there is the application package 17b of the received application version in the management server 10 (Step S7).

In the case where the application package 17b is not in the management server 10 (N in Step S7), the application updating unit 11d acquires the application project AP from the image forming apparatus 20 and stores the acquired application project AP in the storage device 17 (Step S8).

Next, the repackaging unit 11e changes the license authentication necessity information included in the received application code file CF to "unnecessary", and repackages the application program (Step S9).

Next, the application installation unit 21a of the image forming apparatus 20 that has once installed the application package 17b downloads the repackaged application package 17b from the management server 10, and performs overwrite installation of the downloaded application package 17b on the image forming apparatus 20 itself (Step S10).

For of the process in the information processing system 1 has been described heretofore.

Supplementary Note

Such technology that when installing an application program in an information processing apparatus and activating the application program by inputting a license key, for example, in order to issue a license key, a user who has purchased the application program accesses a license issuing server, and issues a license key by using a given license access number is conceivable.

Further, for example, such technology that in order to encrypt an application program to be installed in in image forming apparatus, a common key created based on a license key (character string or the like) specified by a data provider is used, and a license key is used as a common key for decrypting the encrypted application program is conceivable.

In license authentication of the above-mentioned application program, a very long character string is used as the license key or it requires an input in a special format in many cases in order to prevent unauthorized use, and thus, license authentication of the application program is troublesome.

Meanwhile, with the information processing system 1 according to the present disclosure, an administrator registers, in the management server 10, a license key for activating an application program to be installed in the image forming apparatus 20. The license key authentication unit 11c of the management server 10 performs authentication by using the license key (Step S6).

After installing an application program according to instructions input by an end user, each image forming apparatus 20 communicates with the management server 10 and performs authentication with a license key.

Since the authentication with a license key is performed by using a license key registered in the management server 10, the end user does not need to input a license key when authenticating the application program installed in the image forming apparatus 20 at hand.

Accordingly, the license key authentication of an application program can be performed without an end user handling a license key.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
one or more information processing apparatuses; and
a management server that is connected to the one or more information processing apparatuses via a network and manages a license key for activating an application program installed in any of the one or more information processing apparatuses,
the management server including:
a first communication device that communicates with the one or more information processing apparatuses;
a first storage device that stores a license key table, a serial number for uniquely identifying the information processing apparatus that installs the application program, an application ID for uniquely identifying the application program to be installed, and the license key for activating the application program to be installed being registered in the license key table in association with each other;
a first ROM that stores a first information processing program; and
a first processor,
wherein the first processor executes the first information processing program to function as
a license key table management unit that receives inputs of the serial number, the application ID, and the license key from an administrator and registers the received serial number, the received application ID, and the received license key in the license key table in association with each other, and
a license key authentication unit that extracts the corresponding license key from the license key table by using the application ID and the serial number received from the information processing apparatus in which the application program is installed, and performs license key authentication of the application program installed in the information processing apparatus in which the application program is installed by using the extracted license key,
the one or more information processing apparatuses including:
a second communication device that communicates with the management server;
a second storage device that stores the serial number corresponding to the information processing apparatus itself;
a second ROM that stores a second information processing program; and
a second processor,
wherein the second processor executes the second information processing program to function as
an application installation unit that installs the application program in the information processing apparatus itself based on instructions input by an end user, and
an authentication requesting unit that transmits the application ID of the application program installed in the information processing apparatus itself and the serial number stored in the second storage device to the management server to request for license key authentication.

2. The information processing system according to claim 1, wherein
the application program is an application package that includes an application code file and an application project, the application code file collectively including attribution information of the application program, the application project being a program main body,
the application code file includes the application ID, an application version, and license authentication necessity information, the application version representing a version of the application, the license authentication necessity information representing whether or not license authentication is required, and
the application project includes a class file, a resource file, and a property file for executing the application program by the image forming apparatus.

3. The information processing system according to claim 2, wherein
the authentication requesting unit further transmits the application code file of the application package installed in the information processing apparatus itself and the serial number to the management server to request for the license key authentication, the application code file including the application ID and the application version.

4. The information processing system according to claim 3, wherein
the first processor executes the first information processing program to further function as an application updating unit that acquires, in a case where the application package of the application version received from the information processing apparatus in which the application program is installed is not stored in the management server, the application project from the image forming apparatus and stores the acquired application project in the first storage device.

5. The information processing system according to claim 4, wherein
the first processor executes the first information processing program to further function as a repackaging unit that changes the license authentication necessity information included in the received application code file to "unnecessary", and repackages the application program.

6. The information processing system according to claim 5, wherein
the application installation unit further downloads the repackaged application package from the management server, and performs overwrite installation of the downloaded application package on the image forming apparatus itself.

7. An information processing method for an information processing system including one or more information processing apparatuses and a management server connected to each other via a network, the method comprising:
via the management server,
managing a license key for activating an application program installed in any of the one or more information processing apparatuses;
receiving from an administrator, inputs of a serial number for uniquely identifying the information processing apparatus that installs the application program, an application ID for uniquely identifying the application program to be installed, and the license key; and
registering the received serial number, the received application ID, and the received license key in a license key table in association with each other, and
via the one or more information processing apparatuses,
installing the application program in the information processing apparatus itself based on instructions input by an end user; and
transmitting the application ID of the application program installed in the information processing apparatus itself and the serial number stored in a storage device of the information processing apparatus itself to the management server to request for license key authentication, and
via the management server,
extracting the corresponding license key from the license key table by using the application ID and the serial number received from the information processing apparatus that has installed the application program; and performing license key authentication of the application program installed in the information processing apparatus that has installed the application program by using the extracted license key.

* * * * *